May 30, 1967
H. F. BUSCHOW
3,322,143
VALVE
Filed Aug. 24, 1966
2 Sheets-Sheet 1
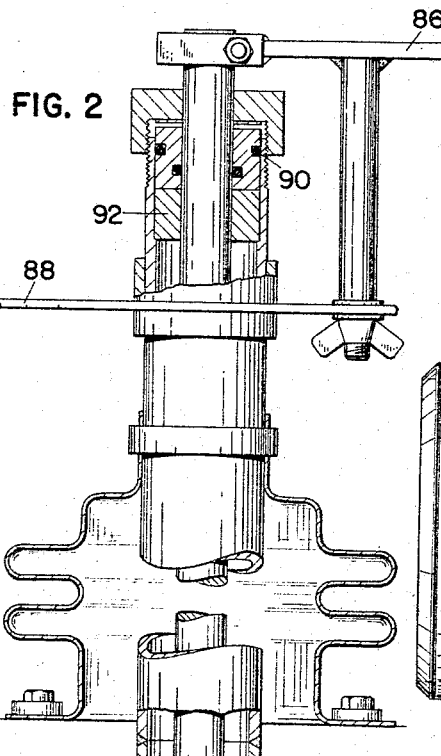
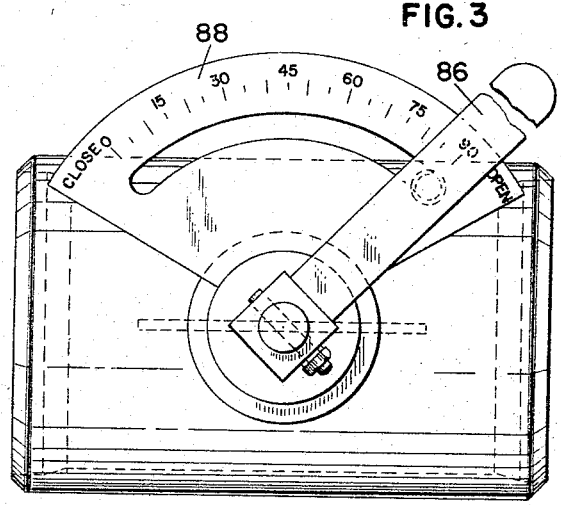
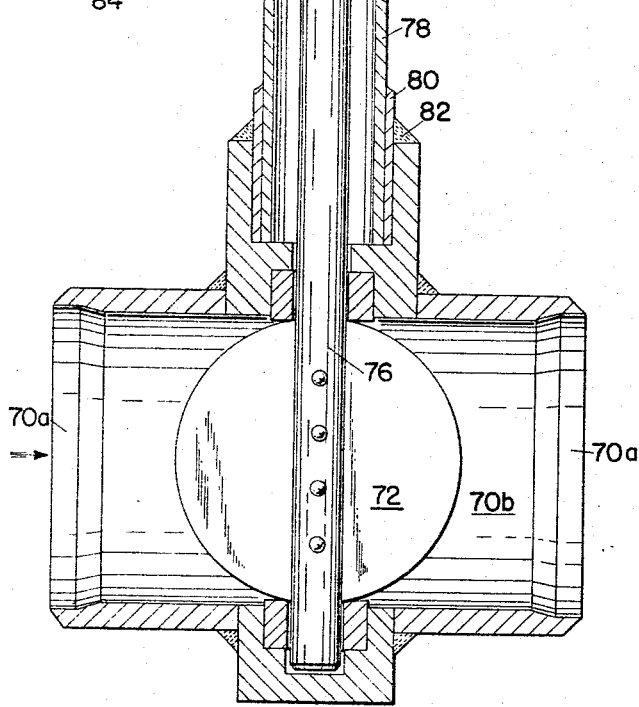
INVENTOR.
HERMAN F. BUSCHOW
BY
*Nathaniel Ely*
Attorney May 30, 1967 — H. F. BUSCHOW — 3,322,143
VALVE Filed Aug. 24, 1966 — 2 Sheets-Sheet 2

INVENTOR.
HERMAN F. BUSCHOW
BY Nathaniel Ely
Attorney

United States Patent Office 3,322,143
Patented May 30, 1967

3,322,143
VALVE
Herman F. Buschow, Hillsdale, N.J., assignor to Hydrocarbon Research, Inc., New York, N.Y., a corporation of New Jersey
Filed Aug. 24, 1966, Ser. No. 575,494
5 Claims. (Cl. 137—375)

The present invention relates to improvements in valves particularly adapted for use in cryogenic service. It is a continuation-in-part of the invention disclosed in my co-pending application, Ser. No. 54,286, filed Sept. 6, 1960, and entitled, Transition Couplings, now U.S. Patent No. 3,208,776, and of my applications for patent, Ser. No. 324,013, filed Nov. 15, 1963, and Ser. No. 345,201, filed Feb. 17, 1964, both now abandoned.

As described in the above applications, it is known that aluminum and stainless steel or copper and stainless steel are not readily subject to welding in the field. Nevertheless, in cryogenic service stainless steel elements are often used as a heat dam to prevent heat flow from aluminum piping. There are many other opportunities for the use of interconnected piping of dissimilar materials and I have found that the use of short transition couplings which may be preassembled are suitable for field welding when they can be made adequately gas tight and of sufficient mechanical strength to take and transfer the normal longitudinal stress in a piping system. It is important that such a coupling should minimize maintenance due to temperature changes, and should be devoid of flanges which require complicated bolts, gaskets, and similar attaching means. A variation of such coupling is particularly applicable to cryogenic valve construction.

In the past, I have found a mechanically shrunk coupling construction to be satisfactory as it can be made mechanically strong and gas tight for most purposes by the steps discussed in Patent No. 2,787,481 of which I am one of the inventors. I have found, however, that such construction requires considerable precision in the formation of the parts and careful temperature control to permit the necessary relative expansion and contraction for assembly. It does not lend itself to typical production line construction.

I am also aware of prior efforts of casting aluminum on ferrous members primarily for the purpose of heat exchange and such practice generally includes a preliminary dipping of the ferrous parts in an aluminum bath. However, unless carefully controlled, the intermediate ferro-aluminum layer which is formed is brittle and mechanically weak. Such a construction can not be used safely in a piping system wherein any movement of the pipes adjacent to the coupling would tend to break the gas tight seal and is particularly objectionable in piping which is in cryogenic service. I have also found that there is some tendency of aluminum-aluminum welds to break where one of the parts is a relatively dense material such as aluminum pipe while the adjacent part is an aluminum casting.

It is the principal purpose of my invention to produce a valve having a coupling of the transition pipe for field welding of dissimilar metals, the parts of the coupling being formed into a unit which is gas tight and of such mechanical strength as to withstand the stresses of adjacent piping.

More particularly, my invention relates to an improved valve, particularly for high pressure and low temperature fluid service, which valve is readily adapted to be welded into a piping system and is provided with an extended valve stem and shield having a coupling element between parts of dissimilar metals.

Another purpose of my invention is to produce a coupling of the transition type for field welding of piping of dissimilar metals the parts of the coupling being formed into a unit which is gas tight and of such mechanical strength as to withstand the stresses of adjacent piping.

My invention also relates to an improved transition pipe or tubular coupling, particularly for high pressure and low temperature fluid service, which coupling is readily adapted to be welded into a piping system and in which the aluminum portion is a forging or extrusion so that the welded joint is substantially stronger and more positive in sealing than with prior available couplings of this type.

Further objects and advantages of my invention will appear from the following description of preferred forms of embodiment thereof taken in connection with the attached drawings in which:

FIG. 1 is a partial central section, with parts in elevation of a coupling for valve service.

FIG. 2 is an enlarged view, partly in elevation, and partly in section of a complete valve and valve stem operator.

FIG. 3 is a top plan view of the valve operator position indicator.

Figure 4:
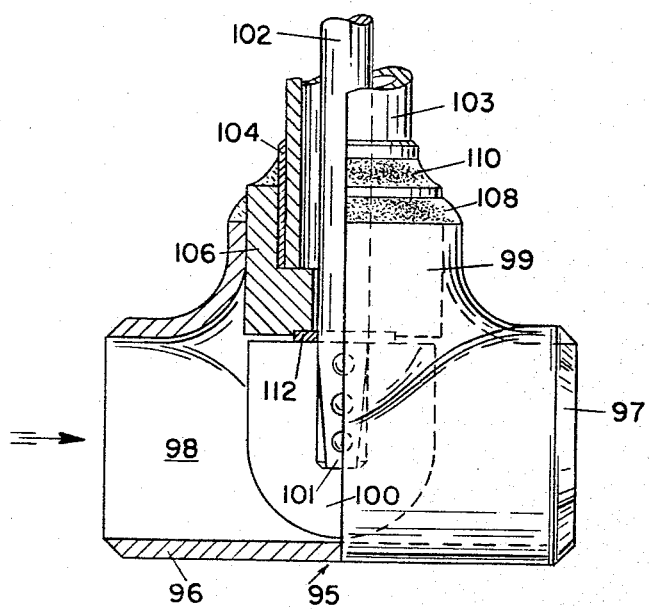
FIG. 4 is a side elevation, with parts in section of a modified form of valve.

In FIG. 1, I have shown a form of coupling which has the characteristics of a pipe but which has no fluid flow through it. In this construction, a valve body 70, of aluminum will have a butterfly valve element 72 mounted on stem 74 which in turn is a part of valve rod 76. This rod, conveniently of stainless steel, is intended to be operated from a remote point to which cold flow will be retarded. A shield or tube 78, also of stainless steel, similarly extends coextensively with the valve rod 76. Usually such shield serves to permit the formation of insulation around the valve without interfering with its operation and also reduces the flow of heat into the cold box. Furthermore, it makes it convenient to service the stuffing box as hereinafter described outside of the cold box.

To conveniently secure the stainless steel shield 78 to the aluminum valve body 70, I form a coupling comprising a cast outer nipple or sleeve of aluminum shown at 80 on the valve shield. Thereafter it is a relatively simple field welding matter to weld the two adjacent aluminum pieces (80 and the valve body 70 as at 82). Such a construction becomes a complete barrier to cold flow and renders field assembly entirely simple and convenient.

While stainless steel-aluminum couplings are in great demand, I also find it possible to use copper base elements instead of the stainless steel. In such case, the time of cooling of the aluminum is somewhat less than with the stainless steel. A different flux will also be used.

I now find that it is preferable, in the interest of rapid production, as well as permanence of gas sealing, to form the lighter aluminum or aluminum alloy outer nipple 80 around the higher density steel inner tube 78 as by a casting operation as hereinafter described as such practice establishes a seal which is tight not only at all normal atmospheric temperatures, but improves in cryogenic service.

This construction of the coupling shown in FIG. 1 is accomplished by at least six principal steps as follows:

(1) Clean the end of high density tube to remove oil and dirt.
(2) Preheat the high density tube to about 500–600° F.
(3) Flux the high density tube to remove oxides and to preheat it nearly to the aluminum melting point.
(4) Pour molten light aluminum or aluminum alloy metal into mold.

(5) Insert high density tube in mold.
(6) Cool assembly promptly.

As to step one, I have found that stainless steel tubes, particularly after storage, frequently have oil films or dirt which must be removed to permit an aluminum contact. I, therefore, normally clean the steel tube with the usual degreasing techniques and I may take a shallow or bright cut without necessarily removing the tool marks. This serves as a standard condition for the preliminary treatment of the tube end.

As a second step, I find it desirable to preheat the tube to about 500–600° F. as by an induction heating coil or other means not shown. It is important that this preheating not exceed about 600° F. and in any event must be below 800° F. in air to prevent a reoxidation of the metal surface.

As a third step in the process, the tube 78 is injected into a flux which, for stainless steel, is primarily a fluoride composition which I find is particularly effective in removing oxides such as chromic oxide. Preferably, the flux is maintained at about 1000° F. to 1100° F. by heating the crucible to a somewhat higher temperature. The steel tube is preferably moved up and down in the flux bath after the tube end has substantially reached such temperature. It has been found that when the tube is initially placed in the flux some solidification of the flux takes place forming a skin in the nature of a crud, and that when this crud redissolves in the flux, the tube end has reached the desired preheating temperature. Depending on the size of the tube, this may take several minutes or more.

As the fourth step in my processing, the molten light metal is next poured into a mold which may be heated by well known means. Usually, the temperature of the melt is around 1400–1450° F. which is about two hundred degrees higher than the melting point. The stainless steel tube 78 with some flux coating on its outer side is then inserted into the melt and may be placed over a plug in the sand mold primarily to assure a uniform clearance with the inner walls of the mold and to diminish the amount of aluminum which would penetrate the interior of the tube 78. It is, of course, entirely appropriate to coat the internal bore of the tube 78 as with graphite to prevent aluminum adhering to the internal surfaces.

As a final step in my processing the aluminum is promptly cooled by the contact with the colder ferrous element not only to cause an immediate shrinkage of the aluminum against the internal tube but to reduce migration of aluminum and iron molecules which would otherwise form an objectionable alloy layer.

While some bond may result, it is incidental and is to be minimized as much as possible. Normally, I find it sufficient to promptly withdraw the stainless steel tube 78 and its attached aluminum nipple 80 from the mold for air cooling.

I find that a coupling of this type is not only unusually gas tight and corrosion free with a very low gas permeability at very low temperatures but will withstand considerable shock treatment as evidenced by tests of repeated heating and sudden cooling. It also withstands shear and has a mechanical strength as great or greater than the piping to which it is attached.

It will, of course, be appreciated that with the higher co-efficient of expansion of aluminum with respect to stainless steel, and the ratio for these materials is nearly two to one, there is an inherent shrinkage as the temperature drops below the initial casting temperature of 1400° F. Furthermore, as the normal operating temperature for such couplings may be several hundred degrees below 0° F. the compression tends to increase and further protect the seal.

A complete valve embodying my invention is shown in FIGS. 2 and 3. The valve body 70 has ports 70a interconnected by a suitable central fluid passageway 70b which may be closed to fluid passage by turning of the valve rod 76 which, in turn, moves the valve element 72 to a closed position. The valve body, of aluminum or aluminum alloy, is readily field welded to the cryogenic piping.

As indicated at 84, a housing known as a cold box surrounds the valve 70 and the usual cryogenic equipment including heat exchangers and the valve rod operator 86 and the position indicator 88 are usually mounted in the atmosphere, outside of the cold box. As a result, there would tend to be a very substantial heat leak into the cold box through the shield 78 and, to some extent, through the valve rod 76 if low density materials compatible with the valve body were used. If, however, the shield 78 and rod 76 are made of material such as copper or stainless steel they will not be compatible and readily welded to the valve body. I, therefore, use the nipple 80 as hereinbefore mentioned.

Cryogenic valve operators are also subject to icing due to atmospheric moisture which tends to frost over the exposed parts and makes valve operation substantially impossible. I prefer to use O rings 90 as moisture barriers between the stuffing box 92 and valve rod 76 as well as between the stuffing box 92 and shield 78 as shown in FIG. 2, to restrain ice from forming on the rod 76.

Figure 5:
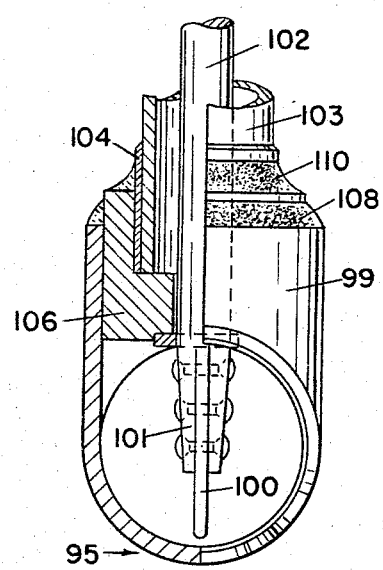
FIG. 5 is a front elevation, with parts in section of the valve shown in FIG. 4.

A modified form of valve construction is shown in FIG. 4 and FIG. 5, such construction having the advantage of a very low cost.

Basically, the valve body 95 is a standard T fitting with the parts 96 and 97 in communication through the body cavity 98 and adapted to be welded to adjacent cryogenic piping. The central T port 99 is then available as the valve support.

As in the prior form of the invention, a valve element 100 is suitably mounted on a valve stem 101 connected to a valve rod 102 which extends to a location outside of the operating area. Surrounding such valve stem is the tubular shield 103 which protects the valve stem extension 102 against distortion or pinching due to the insulation normally packed against the valve.

Again as in the prior form of the invention, the shield 103 is usually of a dense metal such as stainless steel or copper or alloys thereof of low coefficient of heat transfer and as such, tend to prevent heat from flowing into the cold box. The valve body, however, is of low density metal of relatively higher coefficient of heat transfer.

I, therefore, cast an aluminum or similar low density outer nipple 104 on the tubular shield 102 and then insert the nipple into the supporting gland 106. Preferably, this too is of low density material such as aluminum and is preferably heated to permit a shrink fit. The supporting gland 106 is then readily inserted into the T opening 99 and welded to it at 108. The other parts may also be welded as at 110.

The supporting gland will usually be provided with a bearing 112 to serve as a surface for valve 100.

Figure 6:
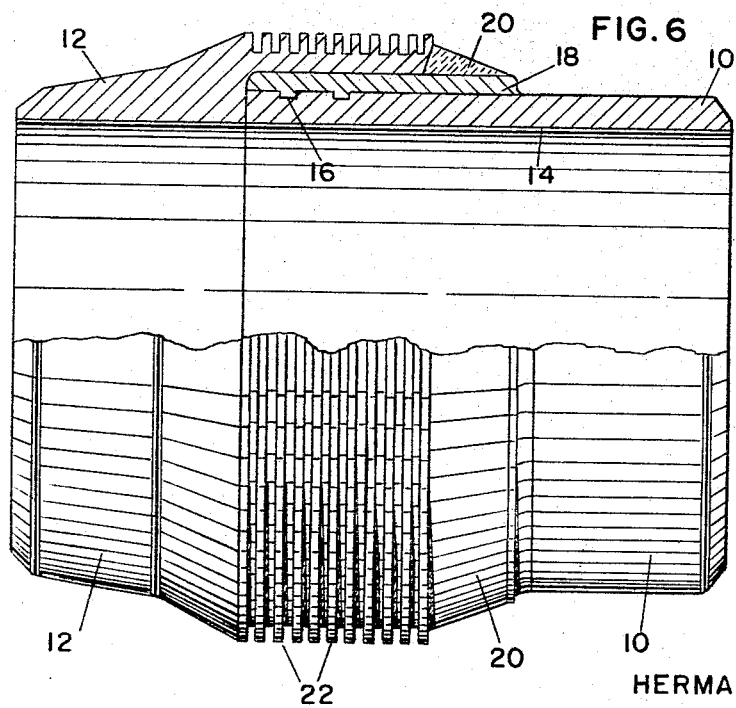
FIG. 6 is a central longitudinal cross section with parts in elevation of another form of coupling.

My invention is also applicable to the construction of a coupling such as shown in FIG. 6 which is adapted for use in the field welding of dissimilar piping such as aluminum and stainless steel when used in cryogenic service with temperatures as low as −423° F. and with pressures in the order of 450 p.s.i.g. where gas leakage is limited to two microns per cubic foot per hour or less. It consists of a stainless steel base nipple 10 to which is attached an aluminum nipple 12. For most effective processing operations, the stainless steel may be of the 18–8 type, and the aluminum is of a suitable alloy commonly designated as 3S by the Aluminum Company of America. Other high strength weldable alloys that can be used are 2S; 61; and 63.

The stainless nipple 10, and the aluminum nipple 12 will preferably have a smooth common bore generally indicated at 14. To increase the axial strength of the coupling as hereinafter described, the stainless steel nipple will also have one or more grooves or slots 16 which may conveniently be of the order of 5/16 of an inch in width and about 0.03 inch deep.

I find that it is preferable, in the interest of improved performance, to form the aluminum or aluminum alloy outer nipple 12 as by a forging or extrusion operation wherein the density of the nipple is substantially greater than a poured or cast nipple and is thus less porous under high differential pressure conditions. As herein used, forging includes wrought or extruded parts, the grain structure of which is substantially finer than appears in a casting. The inner nipple 10 of stainless steel, copper or copper alloy and thus of a normally more dense material, is made from tubing in the usual manner.

The coupling is preferably made in a series of steps or operations as described with reference to parts 78, 80 and 82 i.e., steps 1 to 6, after which the muff or sleeve 18 which has penetrated into the grooves 16 and is thus held rigidly against shear and has the gas tight bond occasioned by the migration of metals between the stainless steel and the aluminum forming an iron-aluminum alloy which is radially microscopically thin and penetrating into the aluminum by radially decreasing amounts to provide a cohesion between the nipple and the muff or sleeve having a relatively low brittleness factor and serving as a gas tight seal, is now machined to a precise size.

The forging or extrusion 12 having been internally machined to a diameter causing an interference fit, is next heated to a somewhat higher temperature to permit the stainless steel nipple 10 and its integrated sleeve or muff 18 to be inserted into the forging 12. By such means, the forging has a shrink fit with the sleeve or muff 18 and the nipple 10. This tends to pre-stress the aluminum portion 12 and to compact the cast sleeve or muff 18 and materially aid gas sealing.

For final sealing, the sleeve or muff 18 and the forging 12 are welded at 20, these parts now being of the same or compatible metals.

I find that a coupling of this type is not only unusually gas tight and corrosion free with a very low gas permeability at very low temperatures, but will withstand considerable shock treatment as evidenced by tests of repeated heating and sudden cooling. It also withstands shear and has a mechanical strength as great as or greater than the piping to which it is attached. The field welding of the coupling to adjacent piping is, of course, readily accomplished by simple techniques for an aluminum or light metal pipe or element such as a valve is weldable to the forged member 12 while the dense metal pipe or part is readily weldable to the dense metal nipple 10.

If desired, the forged metal part 12 may be suitably ribbed or grooved at 22. This grooving is of particular importance to avoid heat shock due to sudden changes in the temperature of the fluid in the pipe, which might tend to break the gas tight seal as, for example, if a high temperature liquid should suddenly pass through the coupling.

It is found that this external grooving does not destroy the gas seal under the most severe cryogenic conditions (as low as −430° F.) for the grooved portion is completely backed up with the muff or sleeve 18 as well as the inserted part of the dense nipple 10. With such a construction, far greater resistance to deformation is obtained.

A coupling of this type having a nominal diameter of three inches was tested at an hydraulic pressure in excess of 3000 p.s.i.g. during which no detectable leak was noted although the coupling became enlarged due to yielding under pressure.

Other tests that were performed were:

Mass spectrometer leak tests.
Heating and cooling shock tests.
The thermal shock test consisted of plunging the joint in boiling water, removing and immediately plunging in liquid nitrogen. A total of 40 of such cycles were performed on each test.

After shock testing, the couplings were again tested for leaks with a mass-spectrometer.

While I have shown and described preferred forms of embodiment of my invention, I am aware that modifications may be made thereto within the scope and spirit of the description herein and of the claims appended hereinafter.

I claim:

1. A valve for internal mounting within a cold box and operation external of the cold box, said valve comprising a body of a low density metal from the class of aluminum and aluminum alloys having a relatively high coefficient of heat transfer, said body having interconnecting ports and adapted to be welded to associated piping, a valve element movable to and from a position to close the passage between the ports, a valve stem operably connected to said valve element, a tubular shield of a high density metal from the class of stainless steel having a relatively low coefficient of heat transfer, said shield being connected to said valve body and being substantially coextensive with said valve stem and normally covered by insulation and thereby protecting said valve stem from interference from turning due to said insulation, said shield having a low density metal nipple from the class of aluminum and aluminum alloys surrounding and integrally secured to the portion of the shield adjacent the valve body, said nipple acting as a transition piece to permit field welding of the high density metal shield to the low density metal valve body.

2. A valve as claimed in claim 1 wherein the valve body is a standard type one piece T fitting having a third port, and a valve gland mounted in said third port, said valve gland having a central bore for the valve stem and being welded externally to the valve body and internally to the metal nipple surrounding the tubular shield.

3. A transition pipe coupling adapted for cryogenic service and consisting of a forged light metal body of aluminum and a dense metal nipple of stainless steel, a muff or sleeve of cast aluminum on the outer portion of said dense metal nipple and having a gas tight bond therewith, said bond being occasioned by the migration of metals between the stainless steel and the aluminum forming an iron-aluminum alloy, said alloy being radially microscopically thin and penetrating into the aluminum by radially decreasing amounts providing a cohesion between said nipple and said muff or sleeve having a relatively low brittleness factor and serving as a gas seal, said forged body having a recess of a size to be an interference fit with respect to said muff or sleeve, said forged body after being expanded so as to overlap said muff or sleeve forming a shrink fit over said muff or sleeve and tending to place said muff or sleeve in compression, and a weld between said muff or sleeve and said forged body to render said coupling hydraulically and pneumatically tight.

4. A transition pipe coupling as claimed in claim 3 wherein the dense metal nipple has at least one peripheral groove and the muff or sleeve has a land portion formed therein to resist axial shear.

5. A transition pipe coupling as claimed in claim 3 wherein the forged body has a plurality of peripheral grooves in the area substantially surrounding the muff or sleeve and the dense metal nipple.

References Cited

UNITED STATES PATENTS

| | | | |
|---|---|---|---|
| 971,136 | 9/1910 | Monnot | 22—204 X |
| 1,115,411 | 10/1914 | Dixon | 285—381 X |
| 2,249,101 | 7/1941 | Wile | 236—92 |
| 2,399,468 | 3/1946 | Cole | 285—381 X |
| 2,543,936 | 3/1951 | Reynolds | 22—204 X |
| 2,608,203 | 8/1952 | Butler | 137—368 X |

(References on following page)

UNITED STATES PATENTS

| | | | |
|---|---|---|---|
| 2,768,648 | 10/1956 | Woolley | 251—308 X |
| 2,769,231 | 11/1956 | Grenell | 285—173 X |
| 2,823,933 | 2/1958 | Hickman et al. | 285—173 |
| 3,083,945 | 4/1963 | Shafer et al. | 251—315 X |
| 3,132,804 | 5/1964 | Larson | 251—315 X |
| 3,163,449 | 12/1964 | Westfall | 258—329 X |
| 3,208,776 | 9/1965 | Buschow | 285—284 |

FOREIGN PATENTS 570,579  2/1959  Canada.

M. CARY NELSON, *Primary Examiner.*